J. R. HARBECK.
TUBE MACHINE.
APPLICATION FILED JUNE 16, 1911.

1,065,681.

Patented June 24, 1913.

12 SHEETS—SHEET 1.

Witnesses
J. H. Perrault
E. M. Brown

Inventor
J. R. Harbeck.
By Edward N. Pagelsen
Attorney

J. R. HARBECK.
TUBE MACHINE.
APPLICATION FILED JUNE 16, 1911.

1,065,681.

Patented June 24, 1913.

12 SHEETS—SHEET 5.

Witnesses
J. H. Perrault
E. M. Brown

Inventor
J. R. Harbeck.
By Edward N. Pagelsen
Attorney

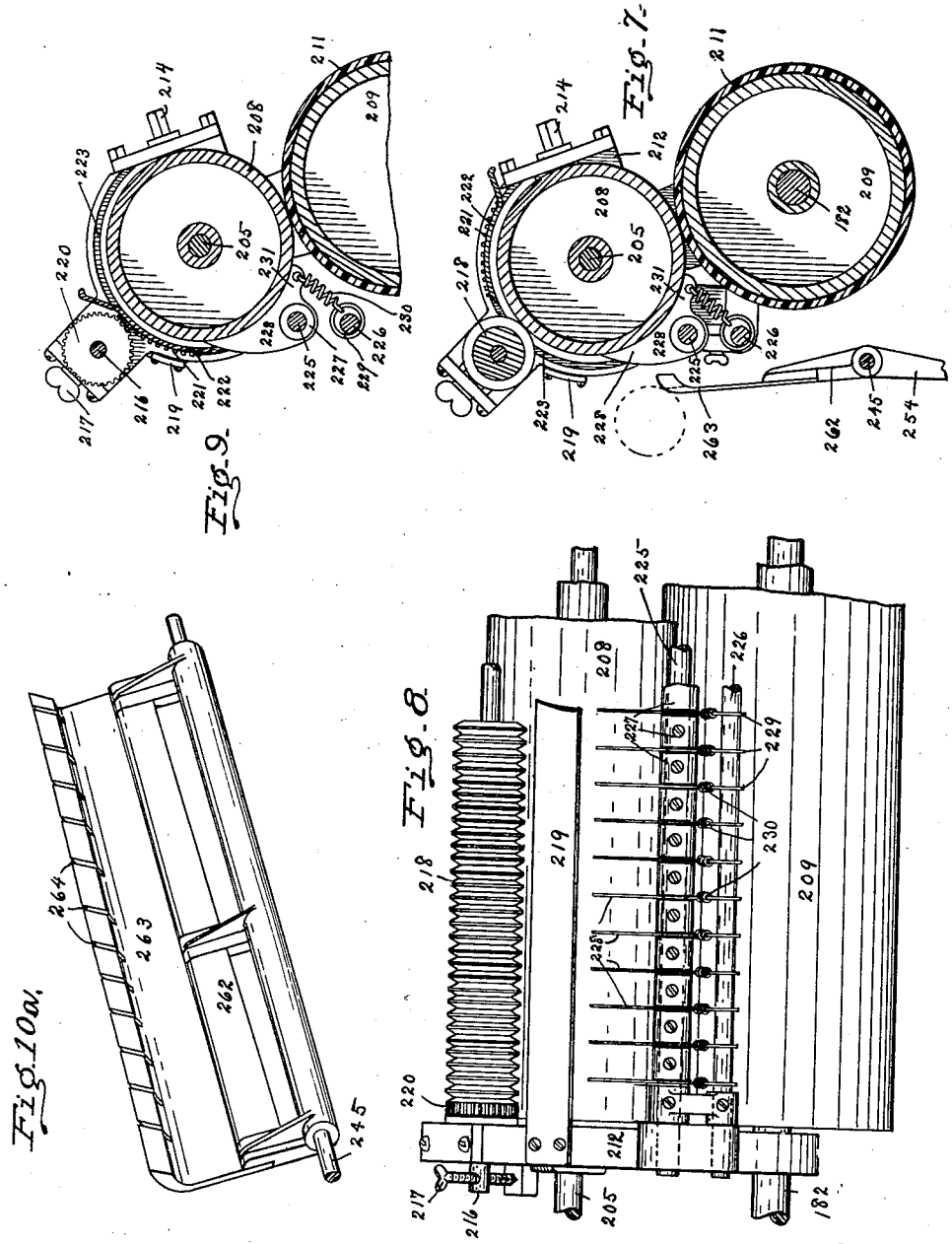

J. R. HARBECK.
TUBE MACHINE.
APPLICATION FILED JUNE 16, 1911.
1,065,681.
Patented June 24, 1913.
12 SHEETS—SHEET 8.
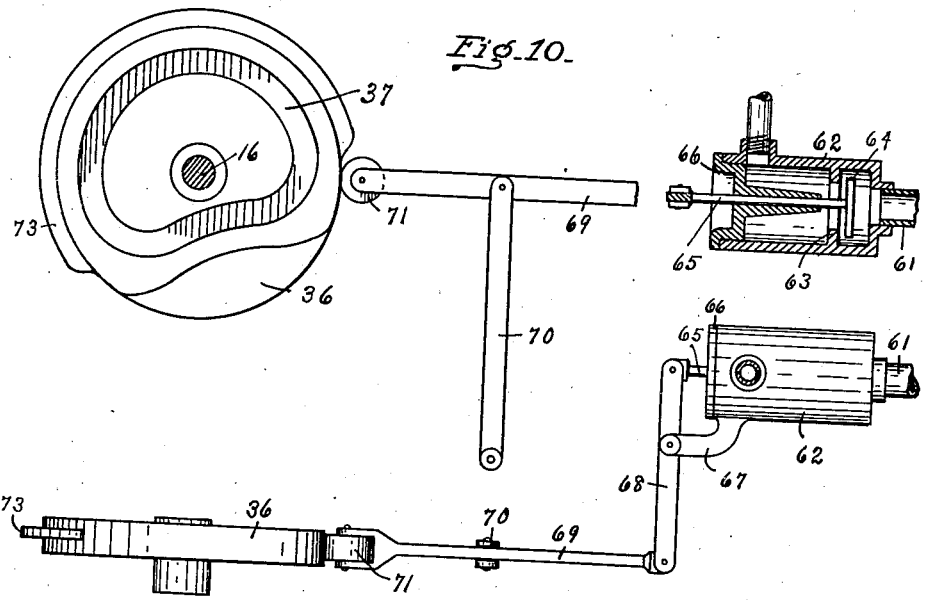
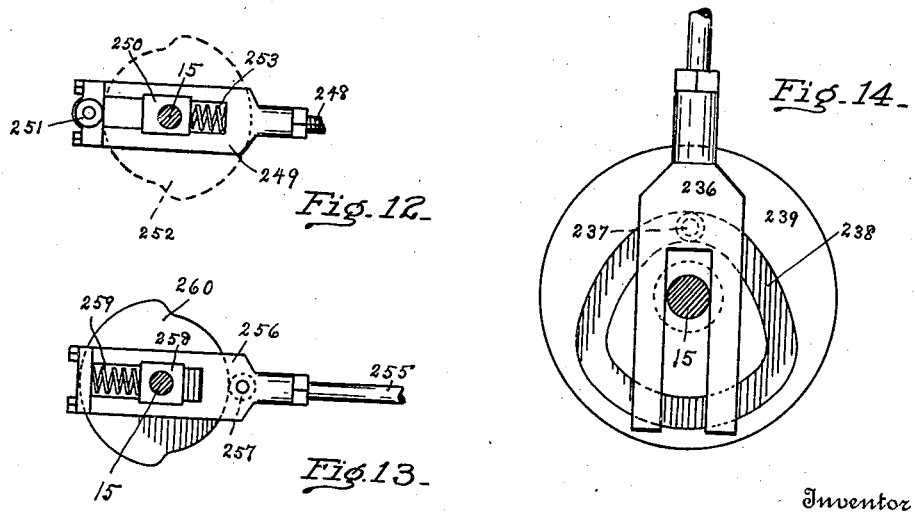
Witnesses
J. H. Perrault
E. M. Brown
Inventor
J. R. Harbeck.
By Edward N. Pagelsen,
Attorney

J. R. HARBECK.
TUBE MACHINE.
APPLICATION FILED JUNE 16, 1911.

1,065,681.

Patented June 24, 1913.
12 SHEETS—SHEET 9.

Witnesses
J. H. Perrault
E. M. Brown.

Inventor
J. R. Harbeck.
By Edward N. Pagelsen,
Attorney

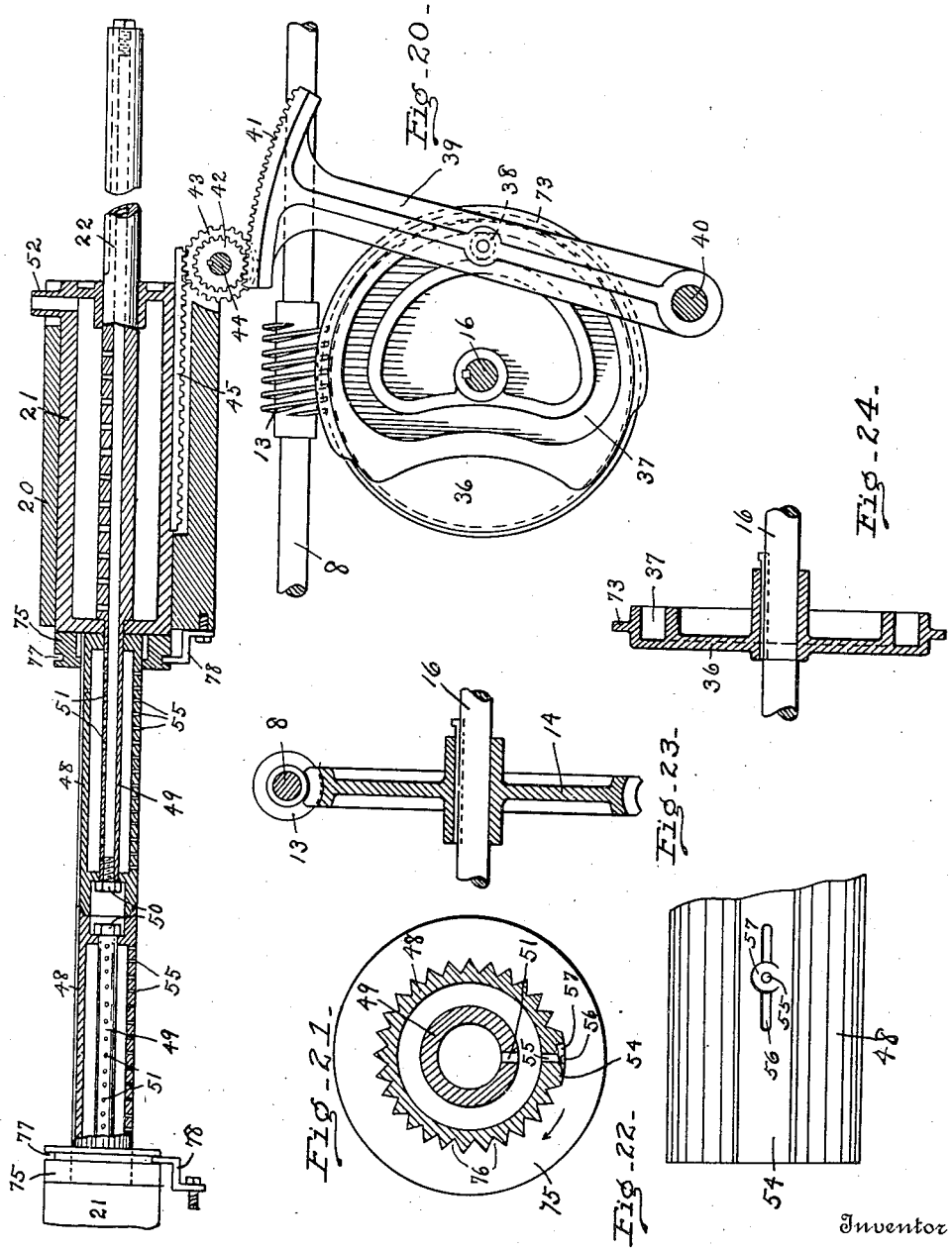

J. R. HARBECK.
TUBE MACHINE.
APPLICATION FILED JUNE 16, 1911.
1,065,681.
Patented June 24, 1913.
12 SHEETS—SHEET 11.
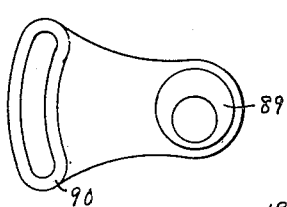
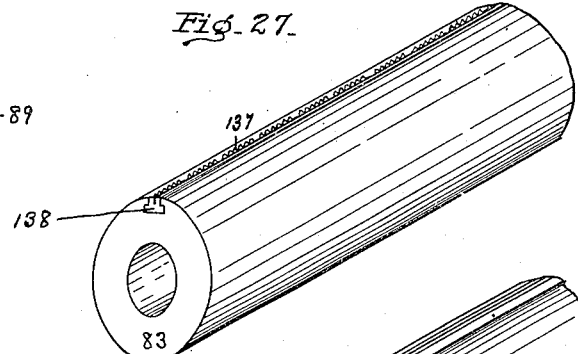
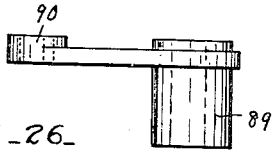
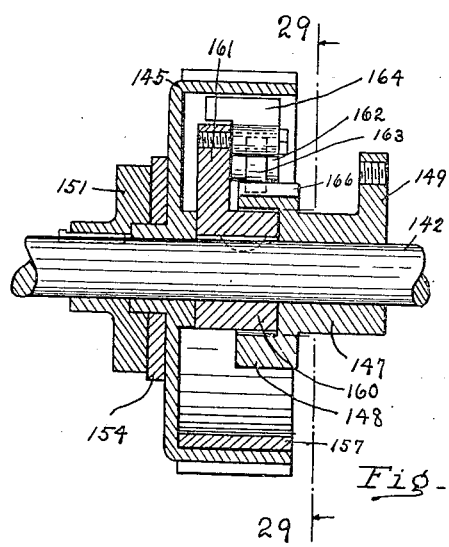
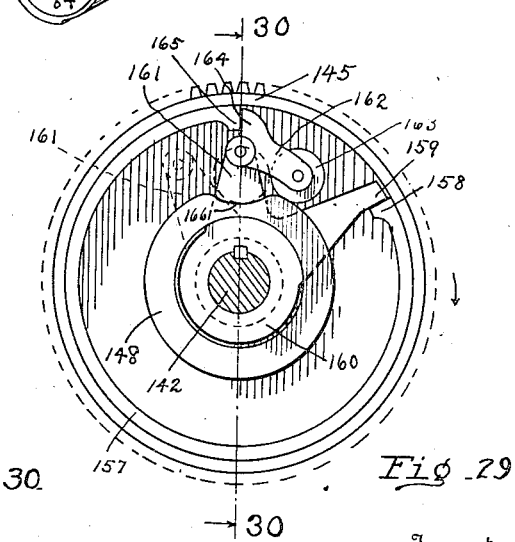
Witnesses
J. H. Perrault
E. M. Brown
Inventor
J. R. Harbeck.
By Edward N. Pagelsen.
Attorney

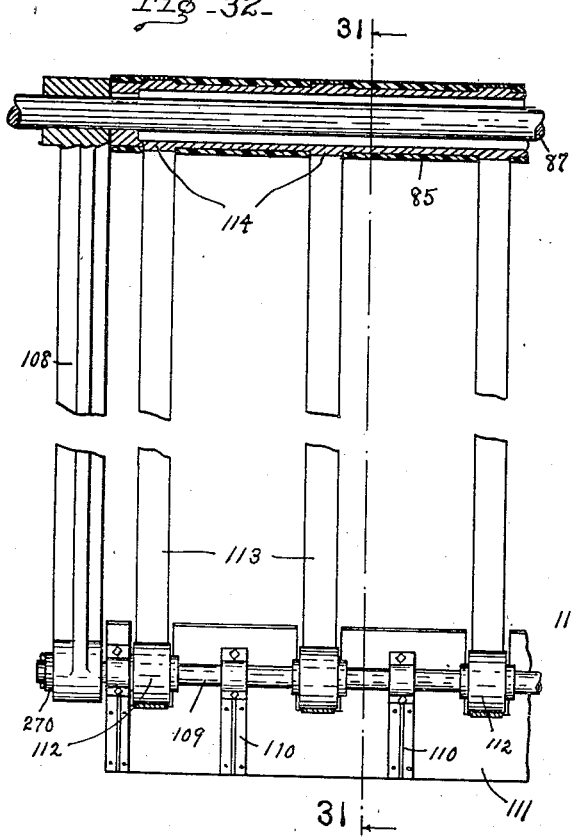
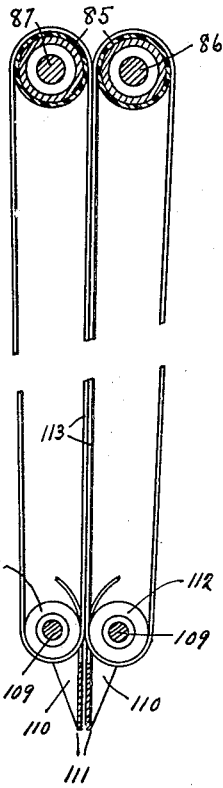
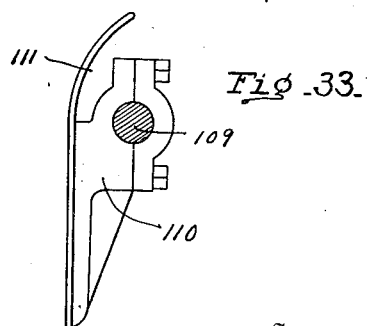

UNITED STATES PATENT OFFICE.

JERVIS R. HARBECK, OF DETROIT, MICHIGAN, ASSIGNOR TO DETROIT CAN COMPANY, OF DETROIT, MICHIGAN, A CORPORATION OF NEW JERSEY.

TUBE-MACHINE.

1,065,681.   Specification of Letters Patent.   Patented June 24, 1913.

Application filed June 16, 1911.   Serial No. 633,584.

*To all whom it may concern:*

Be it known that I, JERVIS R. HARBECK, a citizen of the United States, and a resident of Detroit, in the county of Wayne and State of Michigan, have invented a new and useful Tube-Machine, of which the following is a specification.

This invention relates to the construction of machines for convolutely winding a band of paper into tubes, of the type shown in my Patent No. 994,998, dated June 13, 1911, and its object is to provide a tube machine which shall have a plurality of duplex mandrels, thus giving it great capacity, both as to the length and the number of the tubes.

Figure 1:
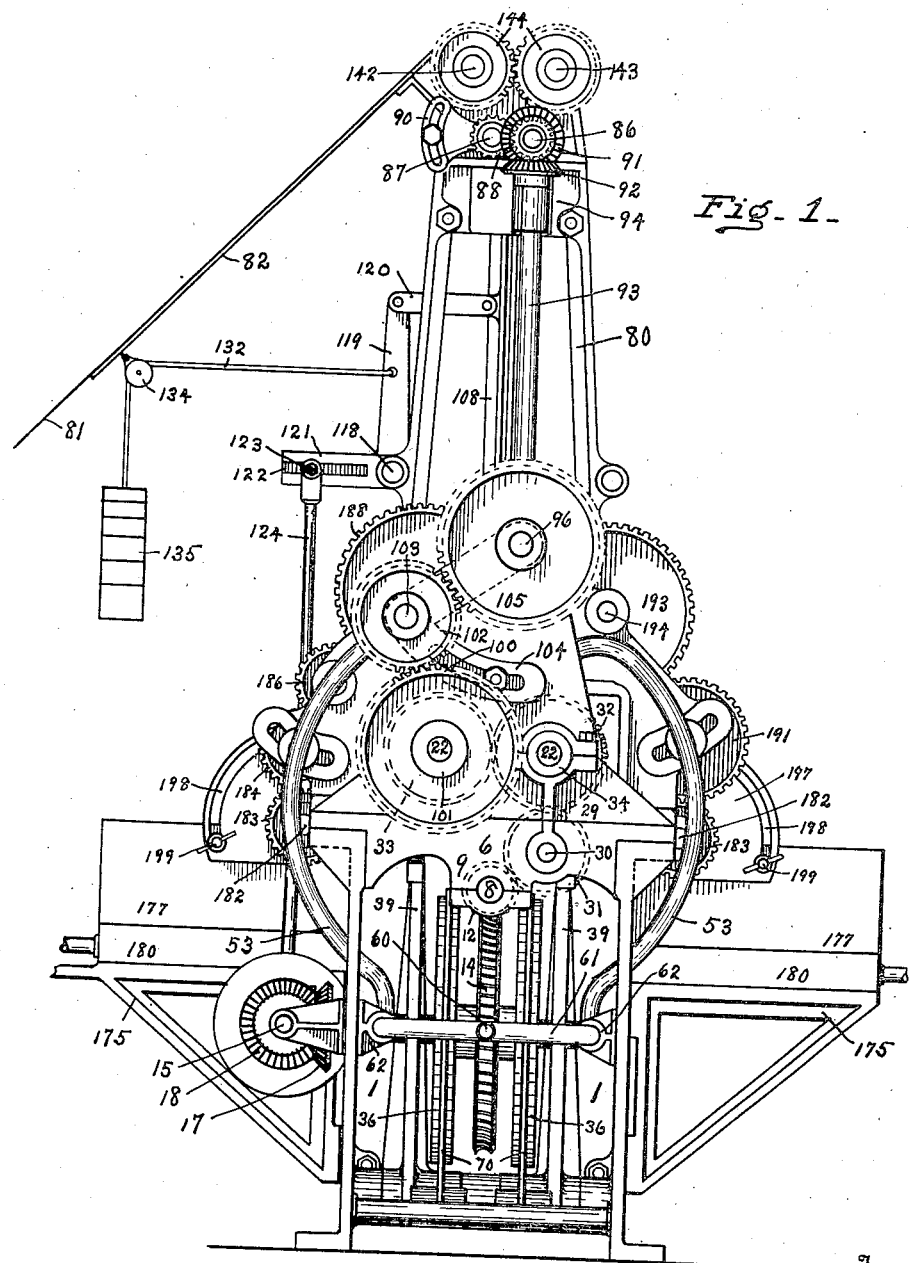
Figure 2:
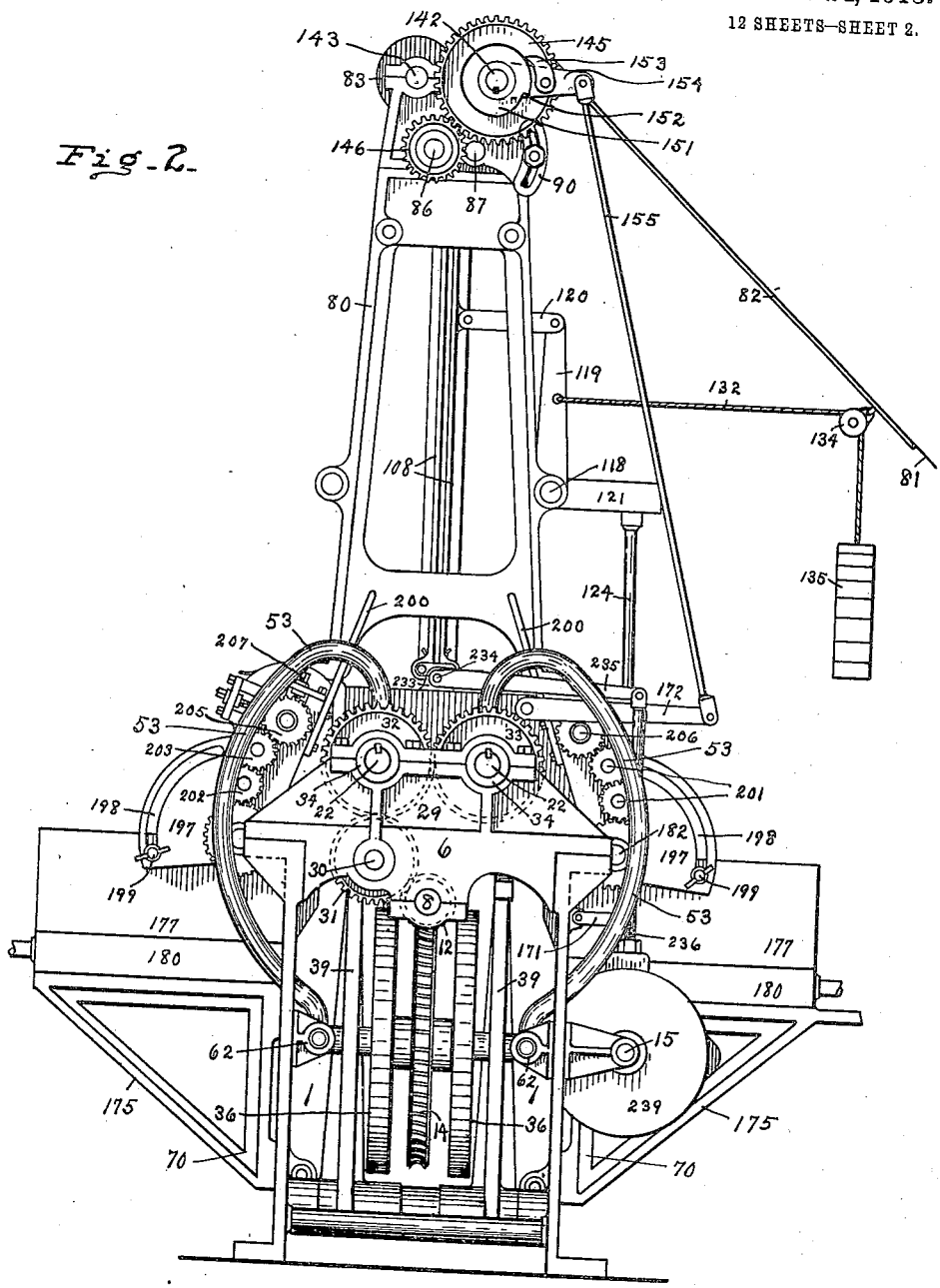
Figure 3:
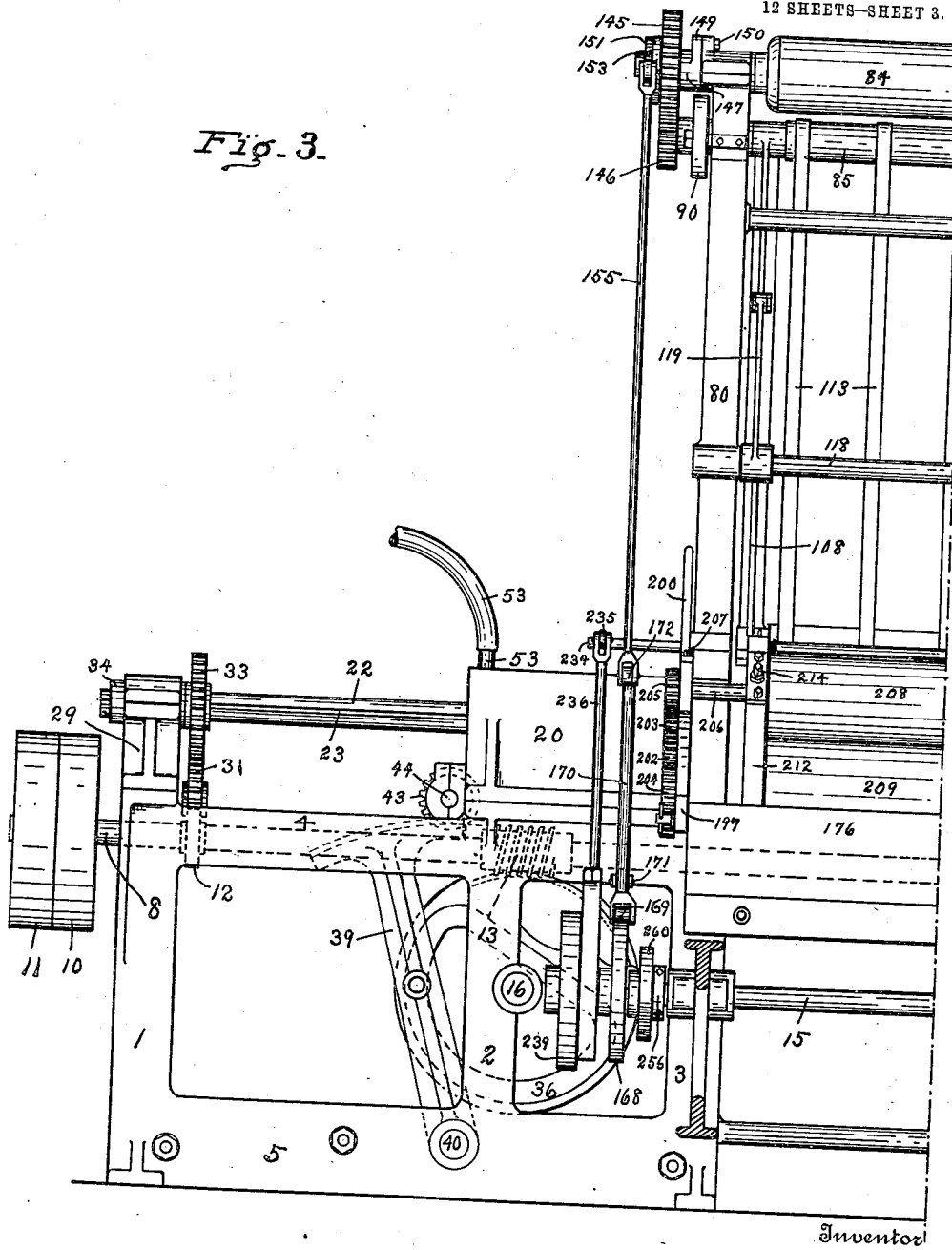
Figure 4:
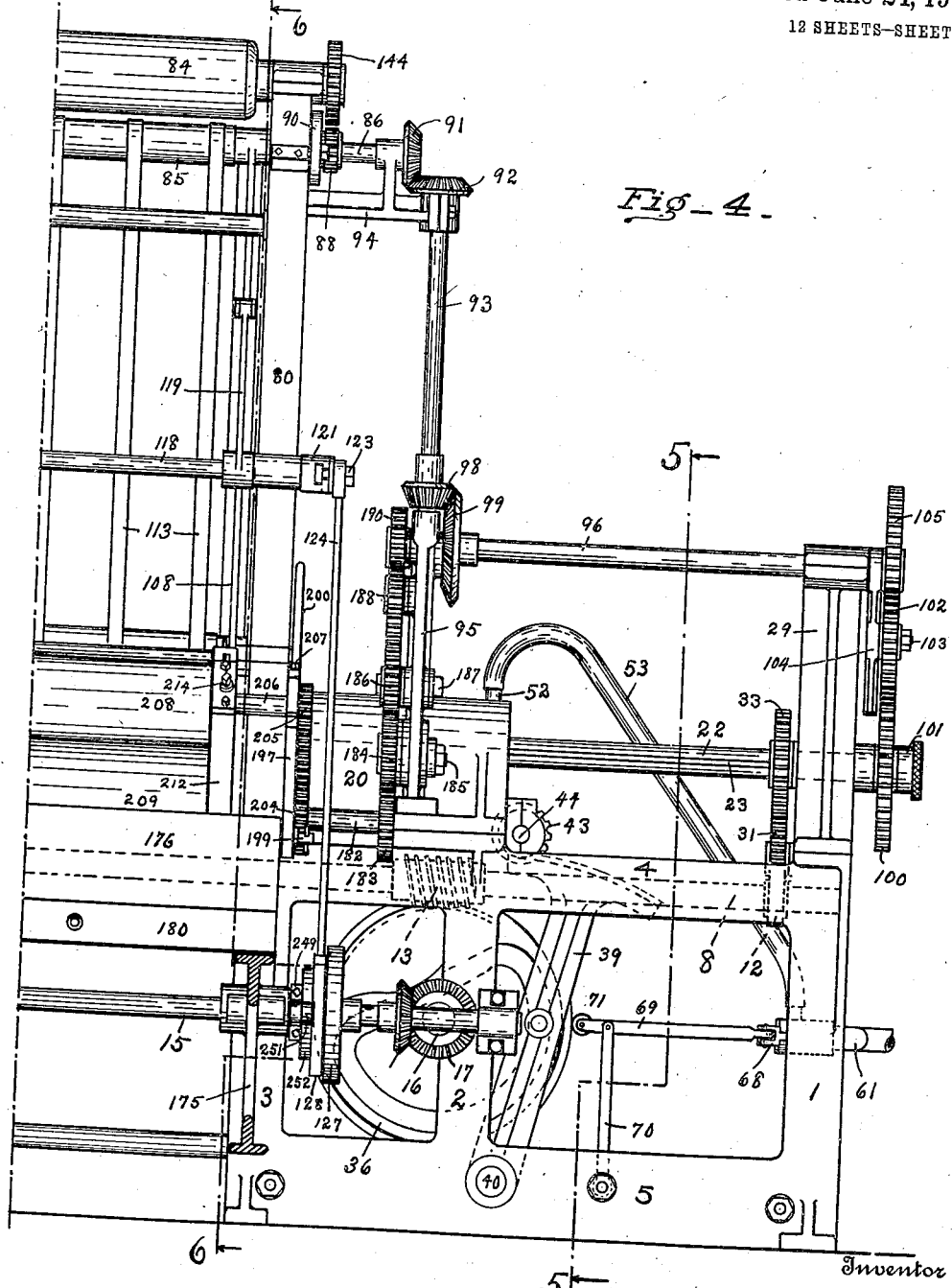
Figure 5:
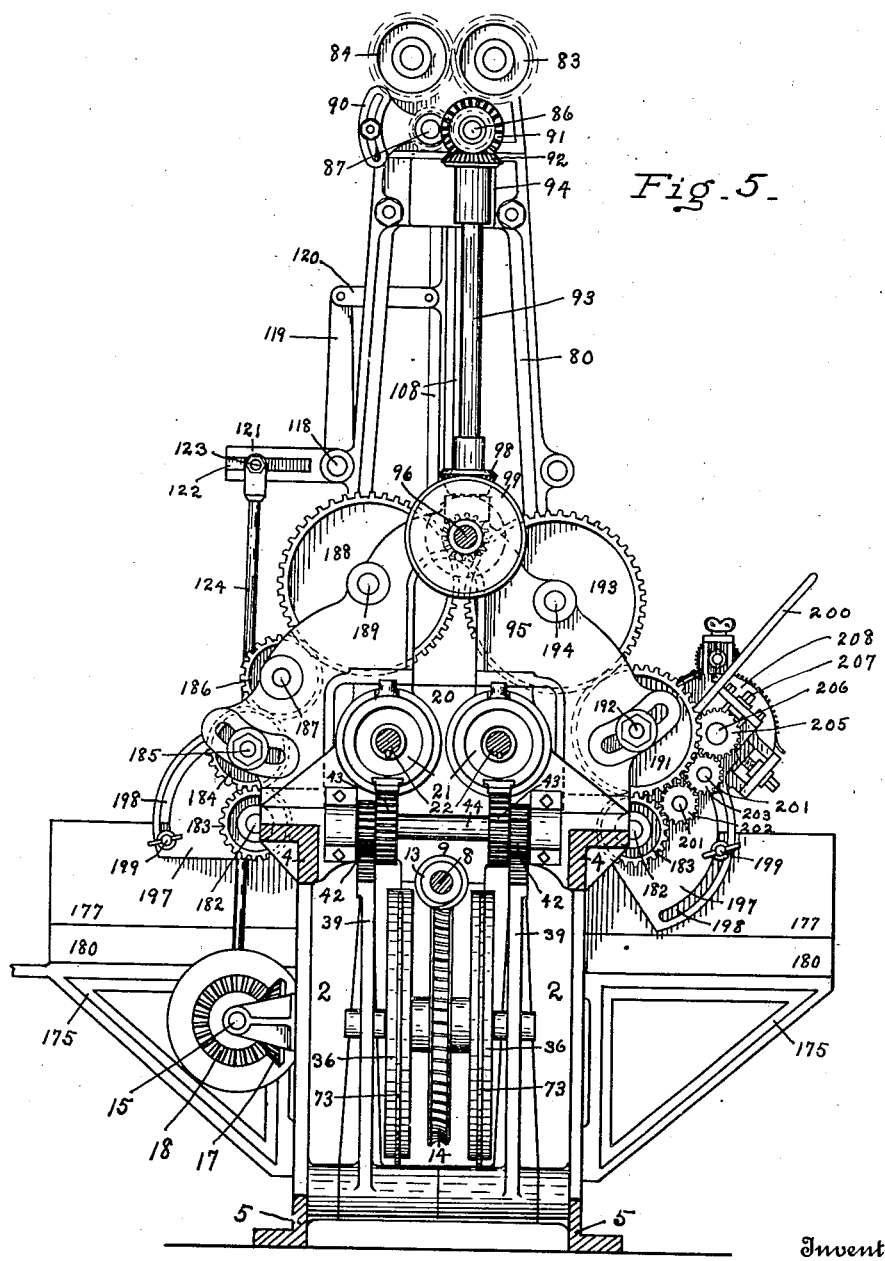
Figure 6:
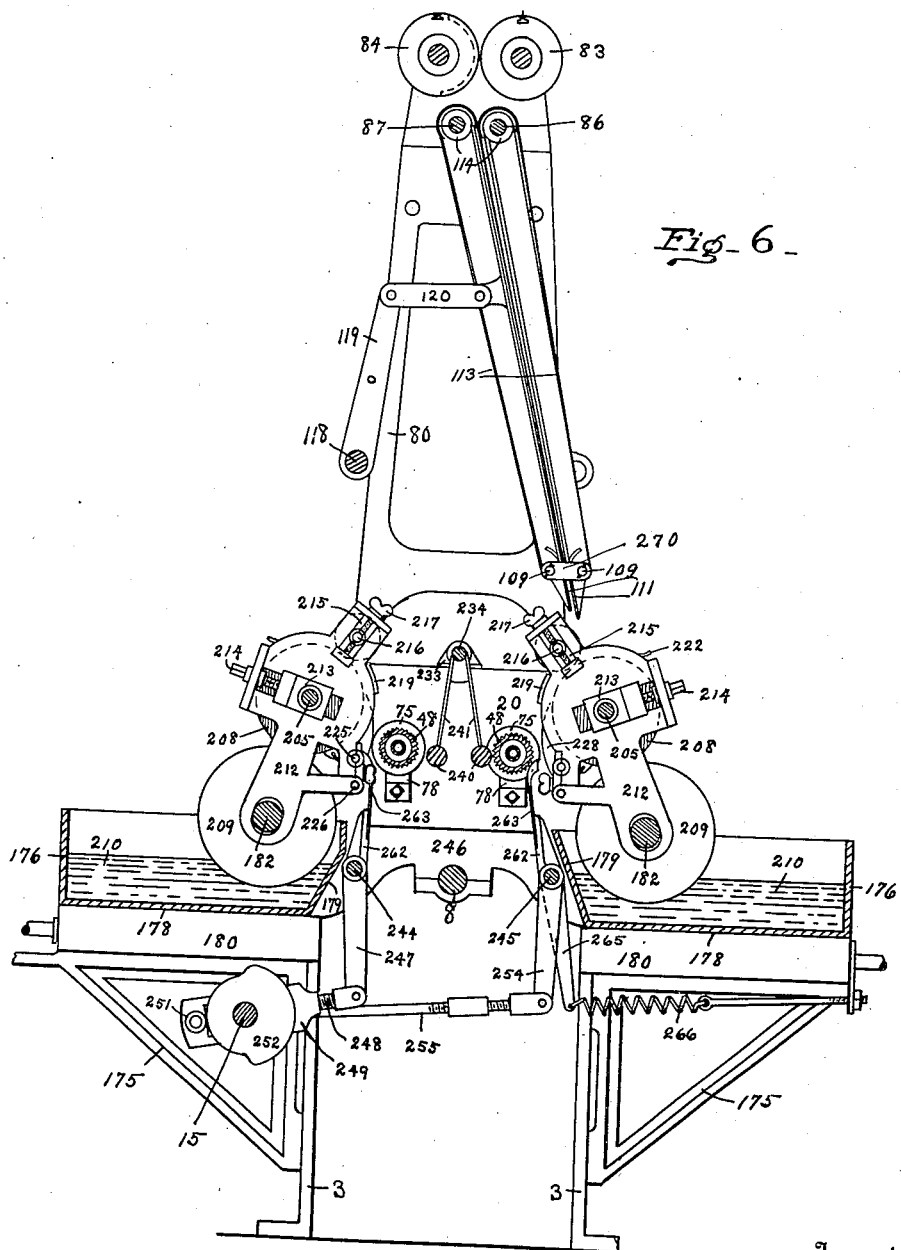
Figure 16:
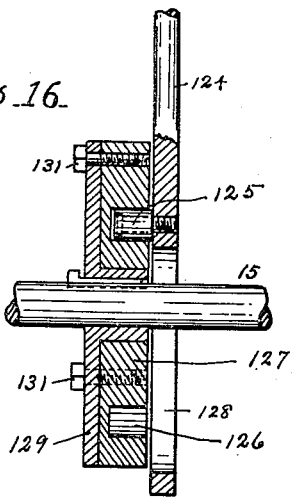
Figure 15:
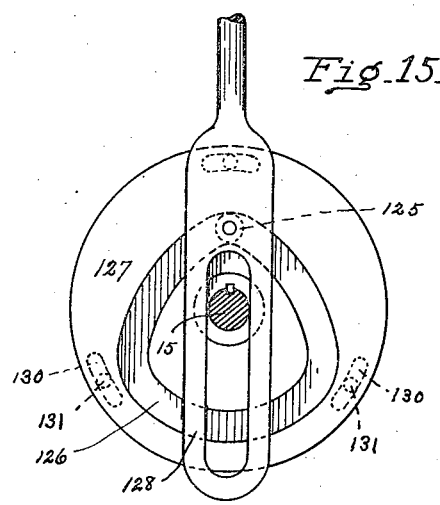
Figure 18:
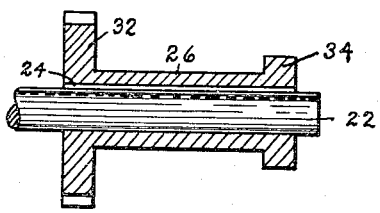
Figure 17:
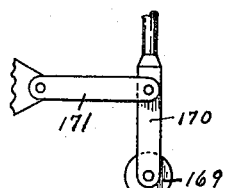
Figure 19:
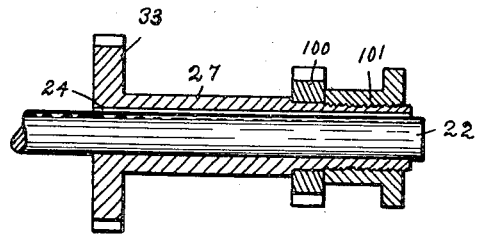

In the accompanying drawings, Figure 1 is an elevation of the front end of the machine. Fig. 2 is an elevation of the rear end of the machine. Figs. 3 and 4 together are an elevation of the left side of the machine. Fig. 5 is a section on the line 5—5 of Fig. 4. Fig. 6 is a section on the line 6—6 of Fig. 4. Fig. 7 is a transverse section of the glue rolls. Fig. 8 is an elevation of these rolls looking from the middle of the machine. Fig. 9 is a transverse section of the rolls showing the slidable shield in operative position. Fig. 10ª is a perspective view of a presser plate which smooths down the last end of the tube material. Figs. 10 and 11 are details of the air valves and the controlling means therefor. Figs. 12 and 13 are elevations of the two cams for actuating the presser plates. Fig. 14 is an elevation of a cam mechanism for actuating the smoothers which press against the paper while it is being wound onto the mandrel. Fig. 15 is an elevation and Fig. 16 a section of the cam mechanism which actuates the main pendulum. Fig. 17 is an elevation of the cam mechanism for controlling the cutters. Figs. 18 and 19 are details of the driving gears of the mandrel. Fig. 20 is a detail of the mandrels and of the devices for reciprocating them, a portion being shown in longitudinal section. Fig. 21 is a cross section of a mandrel. Fig. 22 is an elevation of a portion of the mandrel on a larger scale. Fig. 23 is a vertical section of the worm and gear shown in Fig. 20. Fig. 24 is a vertical section of the cam shown in Fig. 20. Figs. 25 and 26 are elevation and plan of the adjustable eccentric bearing of one shaft of the feed rolls at the upper end of the pendulum. Figs. 27 and 28 are perspective views of portions of the cutting rolls. Fig. 29 is a section of the cutting-rolls driving mechanism on the line 29—29 of Fig. 30. Fig. 30 is a section on the line 30—30 of Fig. 29. Fig. 31 is a section on the line 31—31 of Fig. 32. Fig. 32 is an elevation of the pendulum with an upper roll in section. Fig. 33 is a detail of a guide plate at the lower end of the pendulum.

Similar reference characters refer to like parts throughout the several views.

The winding mechanism of this tube machine is supported on main front and rear frames and the glue rolls and the devices connected thereto are mounted on base plates supported by brackets projecting from the main frames at the inner ends of the same. The tube material is wound on two mandrels, being fed to them alternately by a pendulum, and the mandrels are each formed of two parts, movable toward each other to form a complete winding mandrel, and from each other to discharge the finished tube. In the drawings, that part of the machine on the right in Fig. 4, that is, the elevation of Fig. 1, will be considered the front.

The main frames at the front and rear of the machine are each formed of legs 1, 2 and 3, top girders 4, bottom girders 5, and cross beams 6. The main shaft 8 is carried in bearings 9 on the cross beams and may have a tight pulley 10 and loose pulley 11 at its rear end. On this main shaft are secured the gears 12 which revolve the mandrels and glue rolls, and the worms 13 which engage the worm gears 14 which drive the slow moving parts, such as the gears which move the half-mandrels in and out, and the various tripping and stopping devices. The present construction is such that each mandrel winds a complete tube at each cycle of the machine; that the worm gears 14 make one revolution at each cycle; and that the cam shaft 15 which is driven from a worm gear shaft 16 by the miter gears 17 and 18, revolves at the same speed.

Extending across between the top girders 4 are heavy hoods 20, in which are slidable the cylinders 21. (Fig. 20). Within the cylinders are revoluble the shafts 22 having keyways 23 to receive the feathers 24 of the sleeves 26 and 27 respectively. See Figs. 18 and 19. These sleeves are revoluble in the bearings 29, mounted on the cross beams 6. Short studs 30 at the front and rear of the machine (Figs. 1 and 2) support idlers 31 which mesh with the gears 12 on the main shaft and with the gears 32 on the sleeves 26. The gears 32 on the sleeves 26 also mesh with similar gears 33 on the sleeves 27 so that the shafts 22 run at the same speed. All but one of these sleeves have collars 34 on their outer ends to prevent them from slipping out of their bearings.

To slide the shafts 22 and the mandrels in and out, two cam disks 36 are secured to each cross shaft 16 and are provided with cam grooves 37 to receive the pins 38 on the levers 39. These levers are mounted on pivot shafts 40 and have segments 41 of teeth, at their upper ends, that engage the gears 42 on the shafts 44. (Fig. 20). Connected to these gears 42 are gears 43 engaging the rack-bars 45 secured to the lower sides of the cylinders 21.

The mandrels are in two parts 48, having cone-and-socket joints at their adjacent ends. They are grooved as shown in Fig. 21 so that the finished tubes may easily slip off. They are mounted on the hollow extensions 49 of the shafts 22, and are held in position by the screws 50. The shafts 22 and their extensions 49 are provided with holes 51. The cylinders 21 have nipples 52 to which lengths of air hose 53 may connect, which lengths also connect to the air valves. It should be understood that the mandrels run continually. During the time one mandrel is winding a tube the two halves of the other mandrel are moving apart and then together again. It may be assumed that six wraps of paper make a tube and that the shaft 16 makes one revolution to twelve revolutions of the mandrels. The two cam disks 36 on each shaft 16 are exactly alike but face outward, and their grooves are so formed that each lever 39 is at rest while the other swings out and back. While the paper is being wound, it is desirable that it be held against the mandrels. These are therefore provided with a cylindrical portion 54 which has suction holes 55, grooves 56 and cups 57. The paper is sucked into the cups and grooves so that the mandrel has a strong grip onto the same.

The suction is provided by any desirable type of pump which connects at 60 to a pipe 61. (Fig. 1). This pipe connects to the valves 62. (Figs. 10 and 11). Within each valve body is a seat 63 and a disk 64 on the stem 65, which stem is guided by the head 66. A bracket 67 supports the lever 68, to the inner end of which is connected the stem 65 and to the outer end the bar 69 which is supported by the pivoted arm 70. A roller 71 on the free end of each link engages its respective cam disk 36, which has a cam flange 73. (Fig. 10). So long as the parts are as shown in Fig. 10, the suction of the pump keeps the disk off its seat and the pressure within the mandrel below normal. But when the flange 73 engages the roller 71 and presses it outward, the disk 64 will be pulled onto its seat and the pressure within the mandrel returns to normal. It will be noticed that each valve is open while the pins 38 of the two levers 39 on that side of the machine are traveling in the circular portion of the cam grooves 37, that is, while the two parts of the mandrel are joined. As the two portions of a mandrel move simultaneously, air valves at but one end of the machine are sufficient. If desired, both cylinders 21 of a mandrel may be connected to their air valve, or else the nipples 52 on the rear cylinders may be plugged.

To assist in the discharge of the finished tubes, a collar 75 is mounted on each half mandrel and is provided with teeth 76 which enter the grooves in the mandrel. A groove 77 in each ring receives a holder 78 secured to the adjacent hood 20. When the parts of the mandrel are separated, a collar 75 engages one end of the tube and pushes it off that portion of the mandrel to which it adheres more tightly.

*The feeding mechanism.*—Extending upward from the inner ends of the front and rear frames are pedestals 80 which carry the feed and cutting rolls. The paper band 81 passes freely to the machine up an inclined apron 82, which is supported in any desired manner, and then over and down between the cutting rolls 83 and 84, which are normally stationary, with the cut-away portion of the roll 84 toward the roll 83, and with the cutting devices up. From over the roll 84, the paper passes down between the feed rolls 85, both preferably coated with rubber. Each is secured to a shaft 86 or 87, which shafts are connected together by gears 88 so that they will run toward each other at the same speed. The shaft 86 is mounted in stationary bearings in the pedestals 80, while the shaft 87 is mounted in the eccentric sleeves 89, (Figs. 25 and 26) which are mounted in bearings in the pedestals. To these sleeves are connected the slotted quadrants 90, by means of which the eccentric sleeves may be held in any desired position and the feed rolls properly spaced.

Connected to the shaft 86 is a miter gear 91 which meshes with the miter gear 92 at the upper end of the shaft 93. The bracket 94 (Fig. 4) supports bearings for the outer end of the shaft 86 and the upper end of the shaft 93, while a frame 95 furnishes a bearing for the lower end of this shaft as well as for the stub-shafts on which are mounted the gears which drive the glue-rolls. A shaft 96 is mounted in bearings carried by the frame 95 and by the frame 29 at the front end of the machine. These shafts 93 and 96 are geared together by the bevel gears 98 and 99.

On the sleeve 27, which is driven by the main shaft, is secured a pinion 100 by means of the screw collar 101. This pinion meshes with an idler 102 on the stub-shaft 103 carried by the swinging frame 104. The frame is pivoted on the shaft 96. The idler 102 meshes with the gear 105 on the shaft 96. The diameter of the pinion 100 determines the speed of the feed and glue-rolls, which must always be such that the paper moves at the surface speed of the mandrels.

The pendulum (Figs. 31, 32 and 33) is formed of two similar portions, each comprising side bars 108 suspended from the shafts 86 and 87, and having shafts 109 secured in their lower ends. On these shafts are brackets 110 for the guide plates 111, and the pulleys 112 for the feed belts 113, which belts also pass around the pulleys 114 on the shafts 86 and 87. The surface speed of these feed belts is the same as that of the mandrels.

As the paper passes down between the belts, it is necessary that the lower edges of the guide plates 111 should be adjacent first to one mandrel and then to the other. Mechanism is therefore provided to swing the pendulum at regular intervals so that each mandrel receives the paper in its turn.

Mounted on the pedestals 80 is a shaft 118 to which are attached the crank arms 119 which connect to the pendulum by links 120. There is also attached the crank arm 121 having a slot 122 in which is adjustably secured the bolt 123, to which connects the upper end of the rod 124. This rod has a roller 125 near its lower end which rides in the cam slot 126 in the cam 127 mounted on the disk 129 on the cam shaft 15, (Figs. 15 and 16). It will be noticed that this rod 124 has a flattened slotted end 128 so that it will be guided on the cam shaft. The disk 129 has slots 130 through which extend the screws 131 which secure the cam and disk together in such a manner that the time of the pendulum movement can be accurately determined. To prevent any lost motion, a cord 132 passes over the pulley 134 carried by the apron 82, which cord connects to the weights 135 and to a lever arm 119.

As the band is wound into two tubes at each cycle, it is necessary to cut off two lengths of paper at each revolution of the shaft 15. To do this, the rolls 83 and 84 are employed. It will be noticed in Fig. 27, that the cutting device is a thin blade 137 of steel having sharp cutting points, in groups, projecting from the surface of the roll 83. The spaces between the groups of cutting teeth leave sufficient paper between slits to enable the feed rolls 85 and belts 113 to unwind the band from the source of supply, but the paper is weakened sufficiently to tear before slipping between these feed rolls. The rolls 83 and 84 are preferably cast iron, the former having the blade 137 secured in its outer surface by means of a holder 138 of any desired material, hard rubber preferred, and the latter having a strip 139 of hard wood in its surface. This strip of wood has a narrow groove 140 to receive the cutters and the roll has one side cut away to normally permit the paper to slide freely. These rollers 84 and 83 are secured to the shafts 142 and 143 respectively, which are geared together by the spur gears 144 at their front ends. Loose on the rear end of shaft 142 is revoluble a cup-shaped gear 145 which meshes with the constantly running pinion 146 on the shaft 86. The proportion between these gears 145 and 146 is the same as that between the diameters of the rolls 83 and 85. Loosely mounted on the shaft 142 is a hub 147 (Fig. 29) which has a cam 148 on its outer end, and an arm 149 on its inner end, secured to a pedestal 80 by a screw 150. See Figs. 2, 3, and 30. Secured to the shaft 142 is the collar 151 which has a shoulder 152 adapted to be engaged by the pawl 153 on the arm 154. This arm is loose on the hub of the gear 145 and is swung by the rod 155.

Within the gear 145 is a clutch-ring 157, normally free, but which may be expanded to engage the bore of the gear. The flange 158 on one end of the ring engages the arm 159 on the hub 160, keyed to the shaft 142. On the other arm 161 of this hub is pivoted a lever 162 having a roller 163 at one end and a shoulder 164 which engages the other flange 165 of the clutch-ring. The cam 148 has a low portion 166 in which the roller 163 normally rests when the arm 161 is in the position shown in dotted lines, Fig. 29. On the cam shaft 15 is a cam 168 (Fig. 17) which has two high points, that lift the roller 169 on the end of the rod 170 twice during each cycle. A link 171 pivoted to the rear end frame, guides the lower end of this rod, while its upper end is connected to the arm 172 pivoted to the rear hood 20. The rod 155 connects to the outer end of this arm.

Twice during each cycle, the arm 154 swings down and up, and during the up-stroke the pawl 153 engages the shoulder 152 and turns the shaft 142 to the right. (Fig. 29). This swings the arms 159 and 161 from the position shown in dotted lines in Fig. 29 so that the roller rides up out of the depression 166 to the position shown in solid lines. This causes the shoulder 164 to swing back and to press back the flange 165, widening the space between the two flanges 158 and 165, and causing the clutch-ring to engage the inner surface of the rim of the constantly running gear 145. The gear then carries the clutch-ring 157 and the hub 160 around with it, causing the cutters to perforate the band of paper at the end of one-fourth revolution, and continuing until the roller 163 gets back to the position shown in dotted lines. This permits the clutch ring to contract and frees the shaft from the gear.

*The glue-applying mechanism.*—Secured to the main end frames are brackets 175 which carry the troughs for the glue which troughs have outer sides 176, ends 177, bottoms 178 and inner sides 179. Beneath the troughs are steam heated boxes 180, by means of which the glue may be kept hot. Journaled at the upper edges of the ends are the shafts 182 which have gears 183 at their front ends. The gear 183 on the left side meshes with the idler gear 184 on the adjustable stud-shaft 185 carried by the frame 95. (Fig. 5.) The idler 184 meshes with gear 186 on the stud-shaft 187; this with the gear 188 on the stub-shaft 189, and this with the gear 190 on the shaft 96. The gear 183 on the right side meshes with the idler 191 on the adjustable stud-shaft 192; this meshes with the gear 193 on the stud-shaft 194, and this in turn meshes with the gear 190 on the shaft 96. As a result, the shafts 182 turn toward each other, as do also the rolls 209 mounted thereon.

As shown in Figs. 3, 4 and 5, plates 197 are pivotally mounted on the shafts 182 and are provided with segmental slots 198 through which the locking screws 199 extend into the ends 177. In Fig. 5, the plate 197, together with the rolls and gears mounted thereon, on the right-hand side of the machine, are shown swung outward, while the similar parts on the left-hand side of the machine are swung inward and mostly hidden by the gears 184, 186 and 188, and by the frame 95. Arms 200 on these plates assist in the manipulation. These plates 197 carry stud-shafts 201 on which are mounted the idler-gears 202 and 203 which transmit movement from the gears 204 on the shafts 182 to the gears 205 on the shafts 206. These shafts 206 are mounted in bearings vertically adjustable in the plates 197 by means of the screws 207. On the shafts 206 are mounted the glue-applying rolls 208 which engage the rolls 209 that dip into the glue 210 in the troughs. The roll 208 is preferably brass and the roll 209 has preferably a coating 211 of rubber.

Refer now to Figs. 6, 7, 8, 9 and 10ª, and accept that the glue-applying mechanism has been properly secured in position by the screws 199. Within the troughs and mounted on the shafts 182 and 205 of the rolls are auxiliary frames 212 which are adjustable by means of the bearings 213 and screws 214. In the upper ends of these frames 212 are slots 215, in which are adjustably mounted the shafts 216 on which are revoluble the guide-rolls 218. Screws 217 limit the movement of the shafts and guide rolls. Plates 219 extend between the frames and hold them properly positioned. Loosely mounted on the shafts 216, at the ends of the guide rolls are the gears 220 which mesh with the racks 221 on the edges of the aprons or shields 222. These shields are slidable in grooves 223 in the frames 212. The frames 212 carry shafts 225 and 226. On the former are collars 227 which separate the stripping knives 228. On the latter shaft are rings 229 to which the springs 230 connect, the opposite ends of the springs connecting to the arms 231 of the stripping knives and hold the upper ends of these knives against the rolls 208. Two separate mechanisms may be employed for smoothing down the paper onto the mandrel. Mounted in bearings 233 on the hoods 20 is a shaft 234 which has an arm 235 extending outward. (Figs. 2 and 3.) On the end of this arm is a rod 236 whose forked lower end extends down over the shaft 15. (Fig. 14.) A pin 237 on this rod enters the slot 238 in the cam 239. The concentric portions of the cam slot are each of such length that each rod 240 (Fig. 6) at the lower ends of the arms 241 is held against its respective mandrel during the finishing of the winding of the tube. The other device is shown in Figs. 6 and 10ª. Shafts 244 and 245 extend between the cross-beams 246 near the inner ends of the end frames. A lever 247 connects to the shaft 244 near its front end, and to the rod 248. This rod connects to the plate 249 which is slidable on a bearing 250 on the shaft 15. (Fig. 12.) The plate carries a roller 251 which is held against the cam 252 (Fig. 4) by the spring 253. A lever 254 is mounted on the shaft 245 near its rear end and connects to the rod 255 extending inwardly from the plate 256. (Fig. 13.) This plate also carries a roller 257, is slidable on a bearing 258 on the shaft 15, and has a spring 259 to hold the roller against a cam 260. (Fig. 3.) On the shafts 244 and 245 are secured the plate holders 262 which carry the presser plates 263 having slots 264 into which the knives 228 extend when the pressers are swung back. The operative portions of the pressers are rounded, as indicated in Fig. 7. If desired, levers 265 may be secured to the shafts 244 and 245, (Fig. 6) and springs 266 to the levers, so that these pressers may always engage the tube material on the mandrels with the same force.

*Operation.*—The paper is brought to the machine in large rolls or in any other desired manner, the only requisite being that the supply shall be continuous and at a constant speed. The end of the band is passed up along the apron 82, over the roll 84, and down between the rolls 85 and belts 113. The operator next slides in the shield 222 to the position shown in Fig. 9, thereby lifting the roll 218 from the glue roll 208, and passes the paper down between the roll 218 and the shield until the end is adjacent the mandrel. The valve in the main suction pipe is opened, which causes a current of air to enter the mandrel through the holes 55, carrying the end of the paper against the mandrel. The machine is then started and the mandrel will begin to wind up the paper as soon as the portion 54 of the mandrel reaches the paper. The shield 222 is slid back which permits the roll 218 to press the outer side of the paper against the glue-covered roll 208. After about one wrap has been made on the mandrel, the cutter rolls cut the paper as explained above, and shortly thereafter the pendulum swings toward the other mandrel. As will be seen in Fig. 6, this movement will cause the paper between the belts 113 to be pulled out faster than the normal feed of the rolls 85, resulting in the paper being torn at the line of cuts. The new end continues down between the belts and is delivered just in the rear of the roller 218 on the opposite side of the machine, which carries it down around the adjacent applying roll 208. In order that the band of paper shall not continue to follow around the glue-covered roll 208, the knives 228 are provided; which knives fit the surface of the roll and separate the paper therefrom. The paper is inclined toward the adjacent mandrel by these knives and is immediately drawn against the mandrel by the air. As soon as the paper begins to wind onto the mandrel, the presser plate 263 is swung against the paper by the high portion of the cam 252 or 260 acting on its particular roller 251 or 257. Immediately thereafter the adjacent rod 240 is also pressed against the paper on the mandrel to assist in smoothing it down. After the mandrel has made the full number of turns to wind the paper, the presser 263 and smoother 240 swing away from it, and the levers 39 pertaining to that mandrel swing toward the ends of the machine, separating the two parts of the mandrel. But because of the collars 75, the tube is prevented from engaging either one of the stationary hoods, and falls as soon as the parts of the mandrel are fully separated. The two parts of the mandrel immediately reunite so that by the time the winding of the tube on one mandrel is completed, the other mandrel is ready to receive the paper. During the winding, the air valve 62 of that particular mandrel is open.

Referring to Fig. 6, it will be noticed that the right guide plate 111 of the pendulum is lower than the left. This is reversed when the pendulum is at the other end of its stroke. It has the advantage of pressing the belts against each other during the feeding, by means of the links 270 on the shafts 109. When the pendulum is swinging, the belts do not press against each other, thus permitting the withdrawal of the final end of the tube material. The pressure between the rolls 208 and 209 is controlled to a large extent by the screws 207. Because of the construction of the depressions 57 and grooves 56 in the mandrels, an unusually strong grip is had on the band of paper. When fewer wraps of paper per tube are desired, the size of the gear 100 is reduced. When the same number of wraps are desired for tubes of larger diameter, the size of this gear should be increased.

Having now explained my construction, what I claim as my invention and desire to secure by Letters Patent is:—

1. In a tube machine, the combination of a plurality of revoluble mandrels parallel to each other, each mandrel formed of two similar portions movable longitudinally toward and from each other, shafts whereon the parts of the mandrel are mounted, longitudinally slidable carriers for the mandrels and shafts, sleeves through which the outer ends of the shafts are slidable and by which they are revolved, rack bars connected to the mandrel carriers, gears engaging the racks to reciprocate the mandrel carriers, a main shaft parallel to said mandrels, and gears connecting the main shaft to the sleeves on the mandrel shafts to revolve the same, and driving means connecting the main shaft and the gears which reciprocate the mandrels.

2. In a tube machine, the combination of a plurality of revoluble mandrels and shafts connected thereto, slidable carriers for the same, hoods in which the carriers are slidable, means to revolve the shafts within the slidable carriers, a pair of pedestals, feed rolls and their shafts mounted at the upper end of the pedestals, a plurality of bars suspended from each feed shaft and having a shaft connecting their lower ends, pulleys on the lower shafts, feed-belts passing around said pulleys and feed rolls, means to revolve the rolls so the adjacent faces of the belts move together, and means to swing the lower ends of the bars between the mandrels at regular intervals.

3. In a tube machine, the combination of two revoluble mandrels, each comprising two hollow half-mandrels having perforations, a sleeve concentric with each half-mandrel, a case in which each sleeve and half-mandrel is slidable, rack-bars connected to said sleeves, pivoted levers having segments of teeth at their free ends, pairs of connected gears connecting said segments to said racks, means to operate said levers to slide the half-mandrels toward and from each other, means to cause a partial vacuum in the half-mandrels and in the sleeves in which they are mounted, and means to feed the tube material alternately to said mandrels.

4. In a tube machine, the combination of a frame, a plurality of revoluble mandrels mounted thereon, a pair of pedestals mounted on the frame, feed rolls and their shafts mounted at the upper end of the pedestals, a frame suspended from each feed shaft comprising side bars and a shaft and guide plates at the lower end of the bars, pulleys on said last mentioned shaft, belts extending around said pulleys and said feed rolls, means to hold the frames together so that adjacent belts contact, means to revolve the rolls and to swing the lower ends of the frames between the mandrels at regular intervals.

5. In a tube machine, the combination of two revoluble mandrels, each comprising two hollow half-mandrels having perforations, means to slide said half-mandrels toward and from each other, a flat pendulum comprising pulleys and belts for feeding the tube material alternately to said mandrels, means to swing the pendulum, a case in which each of said half-mandrels is slidable, and means to cause a partial vacuum in the half-mandrels to cause the tube material to adhere to the mandrels at the perforations.

6. In a tube machine, the combination of a main frame, a pair of revolving mandrels mounted thereon, a main shaft and a cam shaft mounted on the frame parallel to the mandrels, gears connecting the main shaft to the mandrels and to the cam shaft, pedestals mounted on the main frame, a pair of feed rolls mounted on the pedestals, a swinging feed device pivoted at the upper ends of the pedestals and comprising a frame mounted concentric with each feed roll and pairs of belts on said frames, a pair of normally stationary cutting rolls mounted on the pedestals above the feed rolls, gearing connecting the feeding mechanism to the main shaft, cam mechanism for swinging the feed device to conduct tube material alternately to the mandrels, and cam mechanism to cause an operation of the cutting rolls for each swing of the feed device.

7. In a tube machine, the combination of a frame, pedestals mounted thereon, feed rolls at the upper end thereof to cause the tube material to travel at constant speed, a pair of mandrels mounted revolubly on the frame, means to actuate the mandrels to wind and discharge the tubes, a swinging frame mounted concentrically with each feed roll, pairs of belts carried by the frames to convey the tube material downward, means connecting said frames to cause the belts of each pair to contact, and means to swing the frames so the tube material will be conveyed alternately to each mandrel.

8. In a tube machine, the combination of a plurality of revoluble parallel mandrels, each comprising two separable parts, cylindrical carriers for the same, hoods in which the carriers are slidable, a pedestal, a swinging guide pivoted on said pedestal, constantly running belts in pairs carried by the guide and adapted to convey the tube material to the mandrels, and mechanism for swinging the frame at regular intervals.

9. In a tube machine, the combination of a plurality of hollow revoluble parallel mandrels, each comprising two separate parts movable longitudinally toward each other to form the complete mandrel, and separable to discharge the completed tube, said mandrels formed with perforations, means connecting the mandrels with an air pump to cause a suction at the perforations, driving mechanism for the mandrels and for controlling the suction, a swinging guide pivoted on said frame, constantly running belts in pairs carried by the guide and adapted to convey the tube material to the mandrels, and mechanism for swinging the frame at regular intervals to cause the tube material to pass to the mandrels alternately.

10. In a tube machine, the combination of a plurality of revoluble mandrels parallel to each other, each comprising two parts, slidable bearings for the same, a swinging guide for the tube material comprising a frame and constantly running endless belts adapted to convey tube material to the mandrels, and mechanism to swing the guide at regular intervals from one mandrel to the other.

11. In a tube machine, the combination of a plurality of winding mandrels adapted to form tubes from proper material, each formed of two parts joining at the middle of the mandrel, means to slide the parts from each other to remove the tubes when wound, a plurality of sets of belts to feed the material to the mandrels in turn, normally stationary cutting rolls, and means to turn the rolls one revolution for each tube.

12. In a tube machine, the combination of a frame, a plurality of tube mandrels mounted thereon, a main shaft, means connecting the main shaft and the mandrels, a cam shaft, means connecting the shafts, an auxiliary shaft mounted on the frame above and between the mandrels, arms and horizontal-smoothing-rods mounted thereon adjacent the mandrels, and means connected to the cam shaft to move the rods against each mandrel as it winds a tube.

13. In a tube machine, the combination of a frame, a plurality of tube mandrels mounted thereon, a main shaft parallel to the mandrels, means connecting the main shaft and the mandrels, a cam shaft parallel to the main shaft, means connecting the shafts, a shaft mounted beneath each mandrel, a presser-plate mounted on each shaft, and cam-mechanism on the cam-shaft connecting to each shaft whereby a presser-plate is caused to engage the tube material on the adjacent mandrel during the winding of the tube.

14. In a tube machine, the combination of a frame, a plurality of mandrels revolubly mounted thereon in substantially the same horizontal plane, a feeding device mounted above the mandrels and adapted to feed tube materials to the mandrels alternately, a glue receptacle mounted adjacent each mandrel, a constantly revolving roll dipping into the contents of each receptacle, an applying roll running in contact therewith, a laterally movable guide roll in contact with the applying roll to cause the tube material to run in contact with the same, frames at the ends of the rolls, and a shield slidable between the applying roll and the guide roll to prevent the tube material being coated.

15. In a tube machine, the combination of a frame, a plurality of mandrels revolubly mounted thereon in substantially the same horizontal plane, a feeding device mounted above the mandrels and adapted to feed tube materials to the mandrels alternately, a glue receptacle mounted adjacent each mandrel, a constantly revolving roll dipping into the contents of each receptacle, an applying roll running in contact therewith, a laterally movable guide roll in contact with the applying roll to cause the tube material to run in contact with the same, frames at the ends of the rolls, said frames having circular grooves concentric with the applying roll, and a cylindrical shield slidable in said grooves around the applying roll to prevent the tube material from contacting with the glue on the applying roll.

16. In a tube machine, the combination of a frame, a plurality of mandrels revolubly mounted thereon in substantially the same horizontal plane, a feeding device mounted above the mandrels and adapted to feed tube materials to the mandrels alternately, a glue receptacle mounted adjacent each mandrel, a constantly revolving roll dipping into the contents of each receptacle, an applying roll running in contact therewith, a laterally movable guide roll in contact with the applying roll to cause the tube material to run in contact with the same, frames at the ends of the rolls, and a series of blades mounted therein in engagement with the applying roll to remove the tube material from the roll.

In testimony whereof I have signed this specification in the presence of two subscribing witnesses.

JERVIS R. HARBECK.

Witnesses:
EDWARD N. PAGELSEN,
ELIZABETH M. BROWN.